F. M. ZOTTOLI.
RESILIENT VEHICLE WHEEL.
APPLICATION FILED DEC. 2, 1921.
1,435,042.  Patented Nov. 7, 1922.
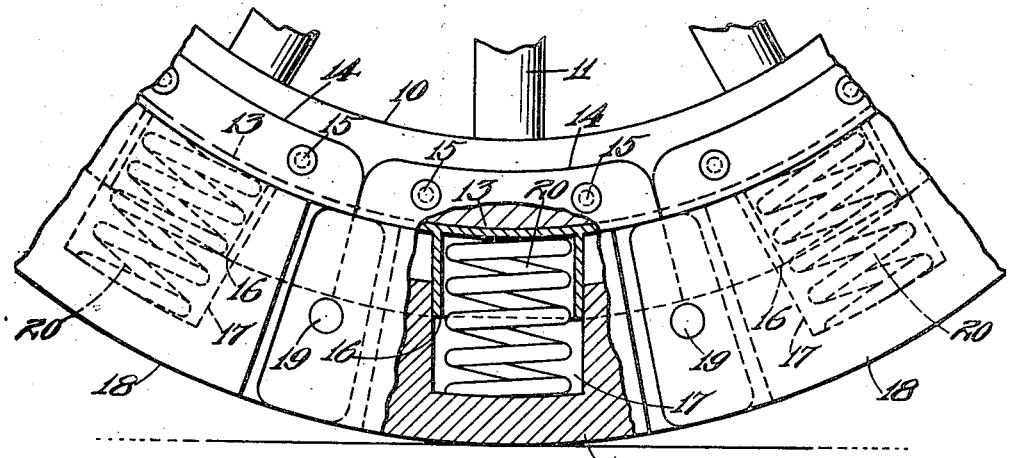
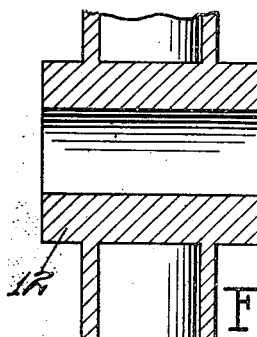
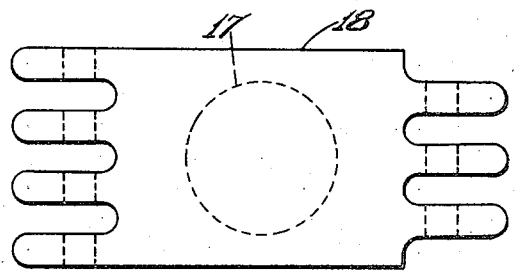
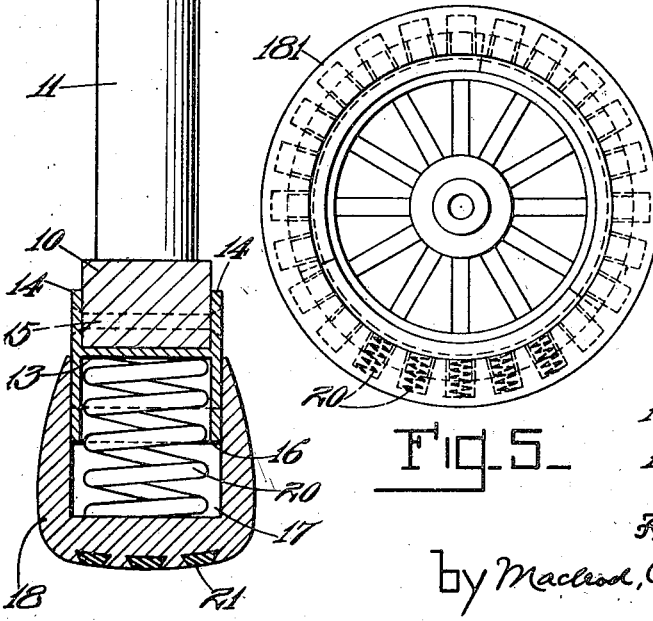
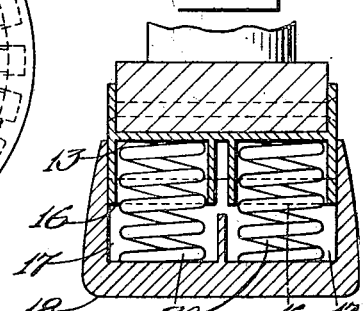
INVENTOR:
Frank M. Zottoli
by Macleod, Calver, Copeland & Dike
Attys Patented Nov. 7, 1922.

1,435,042

UNITED STATES PATENT OFFICE.

FRANK M. ZOTTOLI, OF BOSTON, MASSACHUSETTS.

RESILIENT VEHICLE WHEEL.

Application filed December 2, 1921. Serial No. 519,548.

*To all whom it may concern:*

Be it known that I, FRANK M. ZOTTOLI, a citizen of the United States, residing at Boston, county of Suffolk, State of Massachusetts, have invented a certain new and useful Improvement in Resilient Vehicle Wheels, of which the following is a specification, reference being had therein to the accompanying drawings.

This invention relates to vehicle wheels of the resilient type and has for its object to provide an improved resilient rim or tire structure of relatively simple and inexpensive character which will provide a cushioning effect substantially equal to that of a pneumatic tire while avoiding the well-known objections to the latter, which necessitates practically no change in or modification of the construction of the wheel proper, which is of durable and substantial construction so as to meet the requirements of use, which includes the necessary power transmitting connections to adapt the same for application to a traction wheel, which will afford the necessary resistance to side strain, and which is preferably of a sectional form permitting a worn or accidentally injured portion thereof to be renewed without replacing the entire structure.

The foregoing and other objects of the invention, together with means whereby the same may be carried into effect, will best be understood from the following description of certain forms or embodiments thereof illustrated in the accompanying drawings, in which—

Fig. 1 is a side elevation, partly broken away, of a portion of a vehicle wheel embodying the invention.

Fig. 2 is a transverse vertical section of the wheel.

Fig. 3 is a plan view of a portion of the tire.

Fig. 4 is a view similar to Figure 2 showing a modified construction.

Fig. 5 is a side elevation showing a modified form, in which the tread portion is formed continuous instead of in sections.

Referring to the drawings, there is shown at 10 a wheel felly connected by spokes 11 with a hub 12, said felly, spokes and hub being of any suitable or well-known construction.

Disposed about the periphery of the felly 10 is a series of plates 13 having side flanges 14 engaging the lateral faces of the felly and suitably secured thereto, as by screws or bolts 15. The plates 13 are formed with radially disposed, outwardly projecting thimbles or socket members 16 which are received in suitably disposed sockets 17 formed in tread sections 18 preferably corresponding in number to said thimbles 16, said tread sections being disposed about and surrounding the periphery of the wheel in an annular series. The contiguous sections 18 of the series are formed with interengaging toothed ends, as shown most clearly in Figure 3, the teeth of adjacent sections overlapping and being pivotally connected by transversely disposed hinge pins 19, whereby all of the sections of the series are movably connected. Interposed between each tread section 18 and the corresponding plate 13 is a spiral compression spring 20 partly housed within the corresponding thimble 16 and bearing at its inner end against the bottom of said thimble and at its outer end against the bottom of the socket 17. The depth of the sockets 17 is preferably greater than the height or length, measured radially of the wheel, of the thimbles 16, whereby the tread sections 18 are permitted to yield inwardly as they successively come around on the under side, compressing the springs 20. Said tread sections and thimbles are, however, limited to relative movement in a direction radial of the wheel, engagement of said thimbles with the sockets 17 preventing relative movement of these parts either peripherally or laterally of the wheel, thereby providing a power transmitting connection for traction purposes between the tire and the body of the wheel and affording means for resisting side strains tending to displace the tire laterally with respect to the rim.

The tread sections 18 may be of any suitable material possessing the necessary rigidity to operate in the manner above described and are preferably composed of metal. In the latter event, said tread sections may, if desired, be provided with inserts 21 of lead or other suitable material to deaden the sound.

Preferably, and as above stated, the tread sections 18 correspond in number with the thimbles 16, there being a spring 20 for each of said sections, whereby the several sections are respectively resiliently connected with the felly. For use in heavy vehicles requiring broad tires and therefore necessitating the use of tread sections 18 of considerable width, a plurality of peripheral series of thimbles 16 and sockets 17 may be employed, thereby supporting each of the tread sections at a plurality of points transversely of the tread. Thus, for example, as indicated in Figure 4, each of the plates 13 may be formed with two thimbles 16 suitably spaced transversely of the wheel, the tread members 18 being correspondingly formed with two sockets 17, so that two springs 20 will be employed for resiliently connecting each of said sections with the felly. Obviously, if desired, three or more springs might similarly be employed.

In the modified form shown in Figure 5, the tread member 181 is made continuous instead of in sections like those shown at 18. In this form, preferably twice as many springs 20 are employed as in the form first described.

What I claim is:

1. In a vehicle wheel, a felly, a series of plates disposed about the periphery of said felly, said plates having side flanges secured to said felly and outwardly projecting thimbles, a tread portion comprising an annular series of sections surrounding said felly, said sections having interengaging toothed ends and being formed with sockets to receive said thimbles, hinge pins pivotally connecting the contiguous ends of adjacent tread sections, and springs seated in said thimbles and engaging said sections.

2. In a vehicle wheel, a felly, plates disposed on the periphery of said felly in annular arrangement having thimbles which extend radially outward, an annular series of tread sections hinged together and surrounding the periphery of said annular series of plates, said tread sections being formed with sockets whose walls are at all times in telescopic engagement with the thimbles on the felly plates, and coil springs one end of each spring being seated in one of the thimbles on the felly plate, and the other end being seated in one of the sockets in the tread sections.

3. In a vehicle wheel, a felly, a plurality of thimbles secured to said felly and extending radially outward, an annular series of tread sections hinged together and surrounding the said series of thimbles, said tread sections being formed with sockets which are at all times in telescopic engagement with the thimbles on the felly, and coil springs, one end of each spring being seated in one of the thimbles on the felly and the other end being seated in one of the sockets in the tread sections.

In testimony whereof I affix my signature.

FRANK M. ZOTTOLI.